US012769855B2

(12) United States Patent
Sayyed et al.

(10) Patent No.: US 12,769,855 B2
(45) Date of Patent: Oct. 20, 2026

(54) FEATURE ENABLEMENT OF HARDWARE DEVICES AT AN INFORMATION HANDLING SYSTEM

(71) Applicant: Dell Products L.P., Round Rock, TX (US)

(72) Inventors: Ibrahim Sayyed, Georgetown, TX (US); Laxmi Lavanya Medicherla, Georgetown, TX (US); Alan H. Abdelhalim, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 42 days.

(21) Appl. No.: 19/060,479

(22) Filed: Feb. 21, 2025

(65) Prior Publication Data

US 2026/0252716 A1 Aug. 27, 2026

(51) Int. Cl.
*G06F 21/62* (2013.01)

(52) U.S. Cl.
CPC .................................... *G06F 21/62* (2013.01)

(58) Field of Classification Search
CPC ....................................................... G06F 21/62
See application file for complete search history.

(56) References Cited

U.S. PATENT DOCUMENTS 7,343,431 B1 * 3/2008 Swaminathan ......... G06F 9/452 370/278
10,481,950 B2 * 11/2019 Le Saux ............... G06F 1/3203
10,936,299 B2 * 3/2021 Butcher .................. G06F 8/654
2022/0269797 A1 * 8/2022 Saby ..................... G06F 21/602
2024/0264759 A1 * 8/2024 Enamandram ........ G06F 3/0647
2024/0419800 A1 * 12/2024 Cooper ................... G06F 21/57

OTHER PUBLICATIONS

"AccessibilitySettings Class", url access: https://learn.microsoft.com/en-us/uwp/api/Windows.UI.ViewManagement.AccessibilitySettings?view=winrt-22621, viewed May 15, 2025; 2 pages.
"Intel High Definition Audio", url access: https://en.wikipedia.org/wiki/Intel_High_Definition_Audio, last edited Apr. 6, 2025; 4 pages.

* cited by examiner

*Primary Examiner* — Beemnet W Dada
(74) *Attorney, Agent, or Firm* — McDermott Will & Schulte LLP

(57) ABSTRACT

Enabling features of hardware devices at an IHS, including monitoring usage of computing features associated with the hardware devices at the IHS; detecting an attempt to access a particular computing feature of the computing features of the hardware devices; accessing a table indicating a status of feature enablement flags, the feature enablement flag for each computing feature indicating an enablement or disablement of the respective computing feature; determining that the feature enablement flag associated with the particular computing feature is not enabled, and in response: updating the table to indicate that the feature enablement flag associated with the particular computing feature is enabled; receiving an event indicating that the particular hardware device associated with the particular computing feature is ready for a remediation action; performing the remediation action at the particular computing device that is associated with the particular computing feature to enable the particular computing feature at the IHS.

20 Claims, 3 Drawing Sheets

FEATURE ENABLEMENT OF HARDWARE DEVICES AT AN INFORMATION HANDLING SYSTEM

BACKGROUND

Field of the Disclosure

The disclosure relates generally to an information handling system, and in particular, feature enablement of hardware devices at an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The BIOS (Basic Input/Output System) and/or Embedded Controller (EC) can disable various hardware features to enhance security, stability, or performance. For example, it can disable the use of the keyboard to prevent unauthorized access to the system. It can also turn off the monitor to restrict visual access to the computer. Additionally, the BIOS/EC can disable USB ports to prevent the use of external storage devices. Network adapters can be turned off to restrict internet or network access. The BIOS/EC can also disable audio devices to prevent sound output. Lastly, it can turn off internal storage drives to prevent data access or modification.

SUMMARY

Innovative aspects of the subject matter described in this specification may be embodied in a method of enabling features of hardware devices at an information handling system, including monitoring usage of computing features associated with the hardware devices at the information handling system; detecting, based on the monitoring, an attempt to access a particular computing feature of the computing features of the hardware devices, the particular computing feature associated with a particular hardware device of the hardware devices; accessing, in response to detecting the attempt, a table indicating a status of feature enablement flags, each feature enablement flag associated with a respective computing feature of the computing features of the hardware devices, the feature enablement flag for each computing feature indicating an enablement or disablement of the respective computing feature; determining, based on the accessing, that the feature enablement flag associated with the particular computing feature is not enabled, and in response: providing a command to a controller of the hardware devices indicating the particular computing feature; updating, in response to the command and by the controller, the table to indicate that the feature enablement flag associated with the particular computing feature is enabled; receiving, in response to the updating, an event indicating that the particular hardware device associated with the particular computing feature is ready for a remediation action; and performing, independent of user action, the remediation action at the particular computing device that is associated with the particular computing feature to enable the particular computing feature at the information handling system.

Other embodiments of these aspects include corresponding systems, apparatus, and computer programs, configured to perform the actions of the methods, encoded on computer storage devices.

These and other embodiments may each optionally include one or more of the following features. For instance, creating the table that indicates the status of the feature enablement flags. Performing the remediation action at the particular computing device further includes renumerating a device driver associated with the hardware device. Performing the remediation action at the particular computing device further includes installing a new device driver associated with the hardware device. Performing the remediation action at the particular computing device further includes updating firmware associated with the hardware device. Determining, based on the accessing, that the feature enablement flag associated with the particular computing feature is enabled, and in response, enabling usage of the particular computing feature associated with the particular hardware device. Providing the command to the controller further includes providing the command using a memory-mapped input/output (MMIO) path. Receiving the event further includes receiving an Advanced Configuration and Power Interface (ACPI) event.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
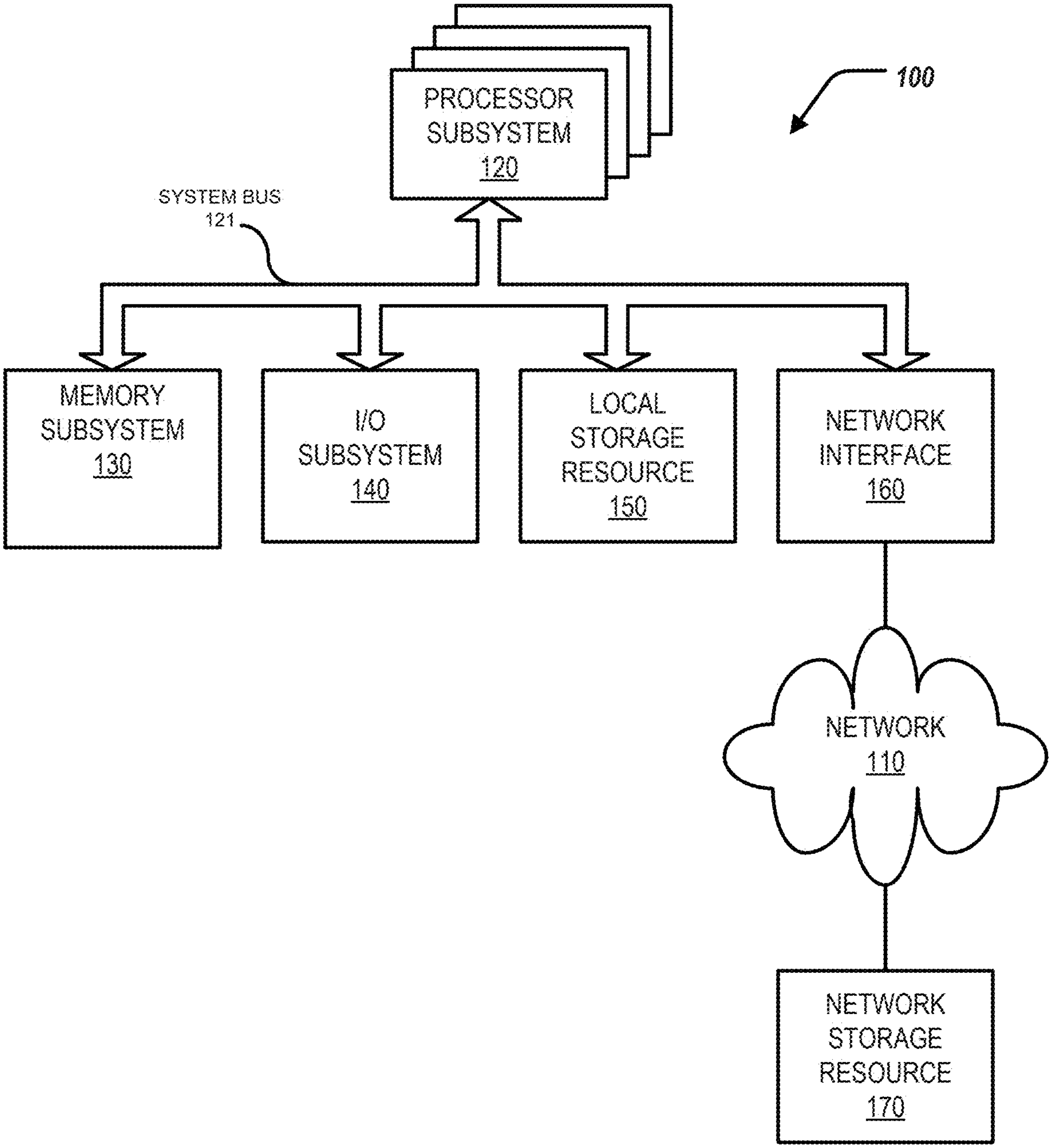
FIG. 1 is a block diagram of selected elements of an embodiment of an information handling system.

This disclosure discusses methods and systems for feature enablement of hardware devices at an information handling system. In short, this disclosure discusses monitoring the attempted usage of computing features of the hardware devices that may be disabled (e.g., by BIOS) and re-enabling such through an operating system (OS) environment. The computing features can be enabled or disabled based on the needs of a user of the information handling system.

Specifically, this disclosure discusses a system and a method for enabling features of hardware devices at an information handling system, including monitoring usage of computing features associated with the hardware devices at the information handling system; detecting, based on the monitoring, an attempt to access a particular computing feature of the computing features of the hardware devices, the particular computing feature associated with a particular hardware device of the hardware devices; accessing, in response to detecting the attempt, a table indicating a status of feature enablement flags, each feature enablement flag associated with a respective computing feature of the computing features of the hardware devices, the feature enablement flag for each computing feature indicating an enablement or disablement of the respective computing feature; determining, based on the accessing, that the feature enablement flag associated with the particular computing feature is not enabled, and in response: providing a command to a controller of the hardware devices indicating the particular computing feature; updating, in response to the command and by the controller, the table to indicate that the feature enablement flag associated with the particular computing feature is enabled; receiving, in response to the updating, an event indicating that the particular hardware device associated with the particular computing feature is ready for a remediation action; and performing, independent of user action, the remediation action at the particular computing device that is associated with the particular computing feature to enable the particular computing feature at the information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Figure 2:
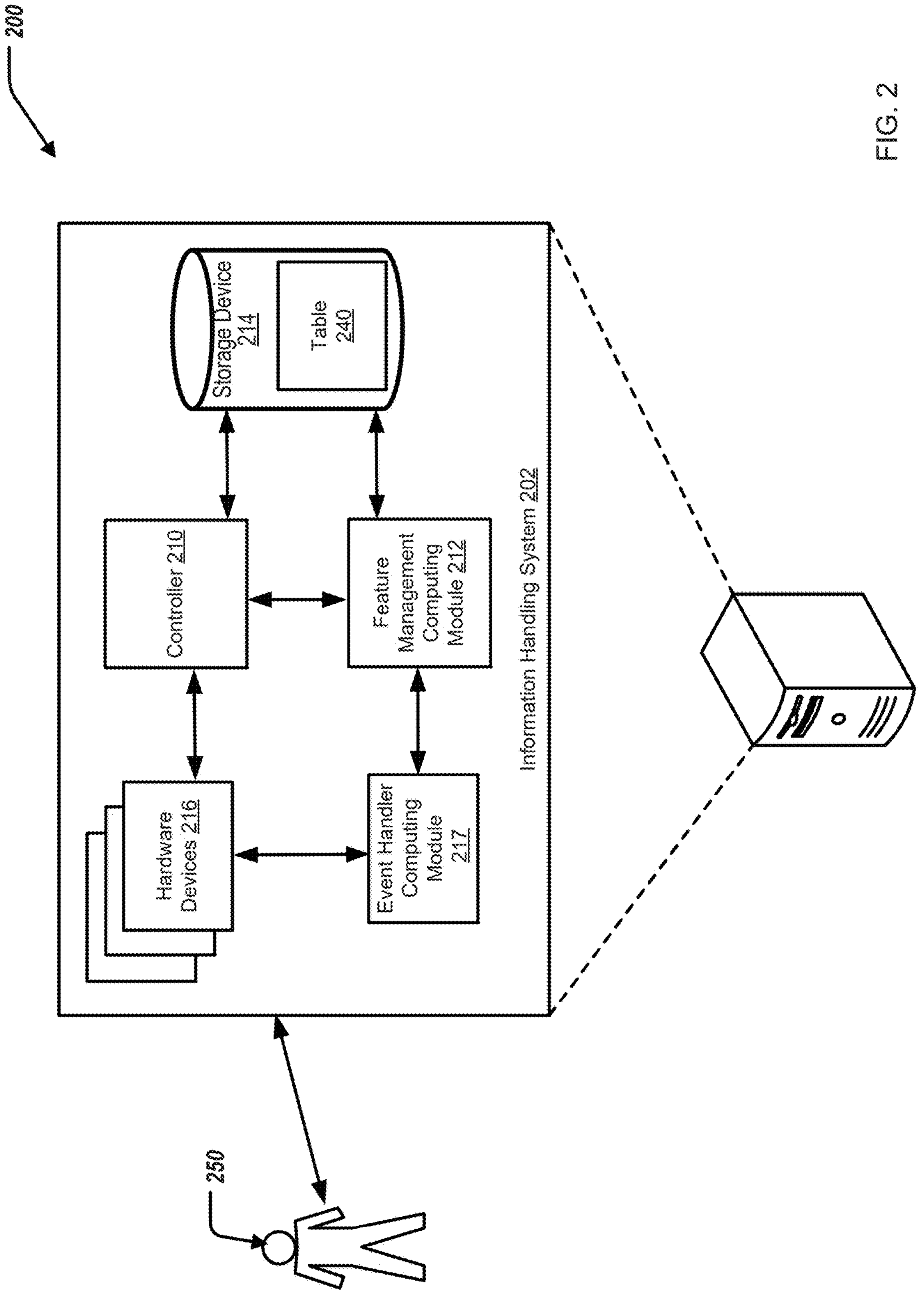
FIG. 2 illustrates a block diagram of an information handling system for feature enablement of hardware devices at an information handling system.
Figure 3:
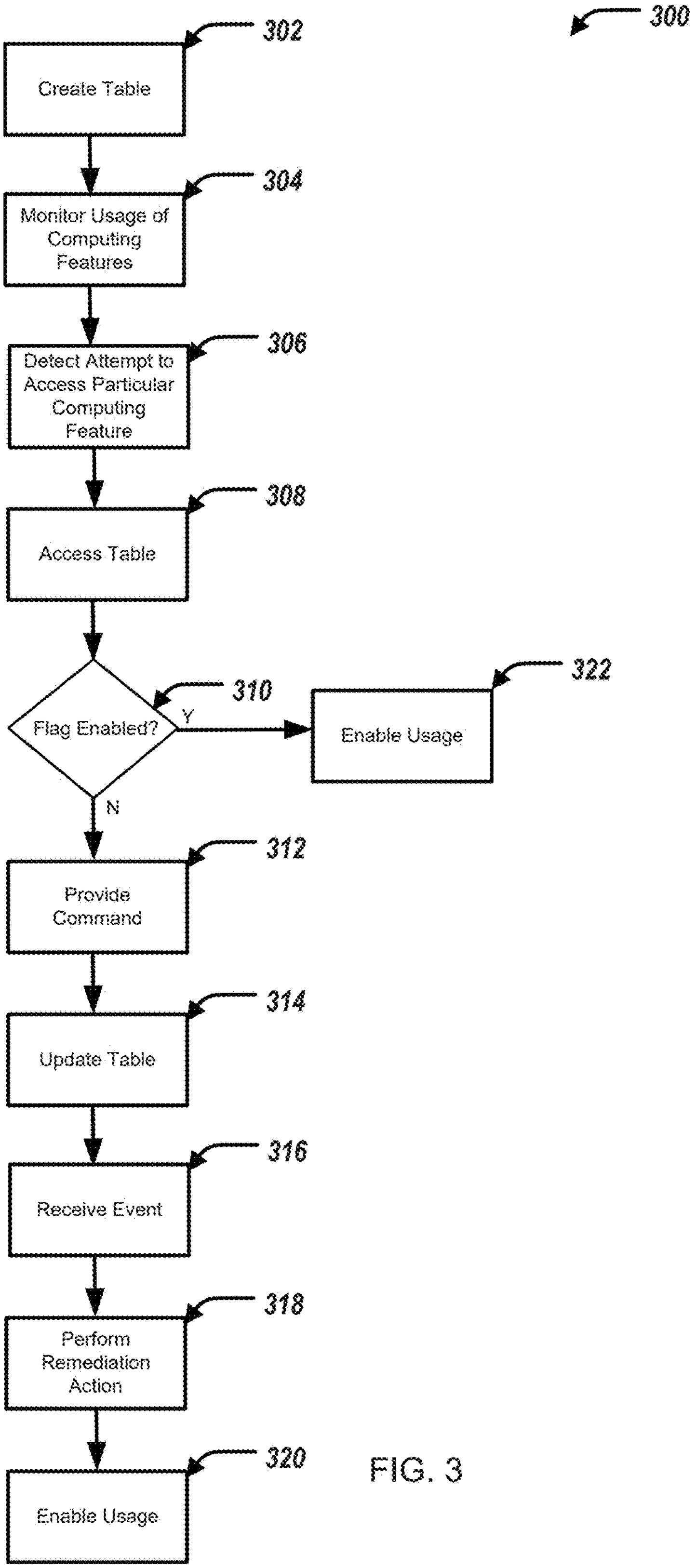
FIG. 3 illustrates a method for feature enablement of hardware devices at an information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system 100). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning to FIG. 2, FIG. 2 illustrates an environment 200 including an information handling system 202. The information handling system 202 can include a controller 210, a feature management computing module 212, a storage device 214, hardware devices 216, and an event handler computing module 217. In some examples, the information handling system 202 is similar to, or includes, the information handling system 100 of FIG. 1.

The controller 210 can be in communication with the feature management computing module 212, the storage device 214 and the hardware devices 216. The feature management computing module 212 can be in communication with the controller 210, the storage device 214, and the event handler computing module 217. The event handler computing module 217 can be in communication with the feature management computing module 212 and the hardware devices 216.

The hardware devices 216 can include audio-related devices such as speakers, an audio card, a microphone; video-based devices such as a display unit, a video card, a web cam; and input devices such as a keyboard, a hand-held point device (mouse), a touchpad; and/or a touchscreen.

The controller 210 can include, or represent, an Embedded Controller (EC), and/or Basic Input/Output System (BIOS).

In short, this disclosure discusses monitoring the attempted usage of computing features of the hardware devices 216 that may be disabled (e.g., by BIOS) and re-enabling such through an operating system (OS) environment. The computing features can be enabled or disabled based on the needs of a user of the information handling system 202.

FIG. 3 illustrates a flowchart depicting selected elements of an embodiment of a method 300 for feature enablement of hardware devices at an information handling system. The method 300 may be performed by the information handling system 100, the information handling system 202, the controller 210, and/or the feature management computing module 212, and with reference to FIGS. 1-2. It is noted that certain operations described in method 300 may be optional or may be rearranged in different embodiments.

The feature management computing module 212 creates a table 240 that is stored by the storage device 214, at 302. Specifically, the table 240 indicates a status of feature enablement flags (or feature enablement variables) that are associated with a respective computing feature of the hardware devices 216. The feature enablement flags of the table 240 indicate, for each computing feature of each hardware device 216, an enablement or disablement of the respective computing feature. The computing features can include operational capabilities of the hardware devices 216. For example, the computing features can include a volume level of the speakers; screen magnification of the display unit; touchpad and/or mouse sensitivity levels; power states of the display unit; keyboard shortcuts; contrast ratio of the display unit; accessibility settings; and the like. The table 240 reflects the status of the feature enablement that is associated with a respective computing feature of the hardware devices 216 while booting of the information handling system 202. In some examples, the table 240 is an Advanced Configuration and Power Interface (ACPI) table.

The feature management computing module 212 monitors usage of the computing features associated with the hardware devices 216 at the information handling system 202, at 304. Specifically, the event handler computing module 217 can provide data indicating the usage of the computing features and the hardware devices 216 to the feature management computing module 212. That is, the feature management computing module 212 can subscribe to notifications regarding the usage of the computing features and the hardware devices 216. The event handler computing module 217 can provide the data indicating the usage of the computing features and the hardware devices 216 to the feature management computing module 212 periodically (e.g., every 1 second, 1 minute); every time the information handling system 202 boots; or based on any periodic-based event. The event handler computing module 217 can provide the data indicating the usage of the computing features and the hardware devices 216 to the feature management computing module 212 in response to a request from the feature management computing module 212.

The feature management computing module 212 can detect, based on the monitoring, an attempt to access a particular computing feature of a particular hardware device 216, at 306. Specifically, the controller 210 (e.g., the BIOS) can disable certain computing features of the hardware devices 216, and a user 250 can attempt to use/implement such computing features. For example, computing features of the hardware devices 216 such as audio or touchscreen can be disabled by the BIOS. For example, computing features of the hardware devices 216 such as audio narrator, display magnification, and high contrast display of the hardware devices 216 can be disabled by the BIOS. For example, certain accessibility-related media computing features of the hardware devices 216 can be disabled by the BIOS.

In some examples, the feature management computing module 212 can detect, based on the monitoring, an attempt to access a particular computing feature of a particular hardware device 216 by detecting change events from the event handler computing module 217.

The feature management computing module 212 accesses, in response to detecting the attempt to access the particular computing feature of the particular hardware device 216, the table 240 from the storage device 214, at 308. Specifically, the feature management computing module 212 accesses the table 240 indicating the status of the feature enablement flags associated with the computing features of the hardware devices 216. The feature management computing module 212 reads a "snapshot" of the BIOS/EC configuration via the table 240 indicating the feature enablement flags of the computing features of the hardware devices 216. In particular, the feature management computing module 212 accesses data indicating the feature enablement flag associated with the particular computing feature of the particular hardware device 216.

The feature management computing module 212 determines, based on accessing the table 240, whether the feature enablement flag associated with the particular computing feature is enabled, at 310. That is, the feature management computing module 212 identifies the feature enablement flag associated with the particular computing feature of the particular hardware device 216, and determines the status of the feature enablement flag-either enabled or disabled.

In some examples, the feature management computing module 212 determines that the feature enablement flag associated with the particular computing feature is not enabled (at 310), and in response, the feature management computing module 212 provides a command to the controller 210 of the hardware devices 216 indicating the particular computing feature of the particular hardware device 216, at 312. That is, the feature management computing module 212 provides the command to the controller 210 including data indicating a "snapshot" of computing features that the user 250 is attempting to access/use/implement. The feature management computing module 212 can provide the command to the controller 210 using a memory mapped input/output (MMIO) path.

In some examples, the feature management computing module 212 provides the command to the controller 210 after determining that operating system (OS) security and UEFI boot security controls are enabled.

The controller 210 updates, in response to the command, the table 240 to indicate that the feature enablement flag associated with the particular computing feature is enabled, at 314. That is, based on the command from the feature management computing module 212, the controller 210 (e.g., the EC or the BIOS) updates the table 240 to indicate that for the particular computing feature of the particular hardware device 216, the feature enablement flag is updated from disabled to enabled.

The feature management computing module 212 can receive, from the controller 210 and in response to the updating, an event indicating that the particular hardware device 216 associated with the particular computing feature is ready for a remediation action, at 316. That is, the EC can send the event to the feature management computing module 212 indicating that the particular hardware device 216 is ready for re-configuration to re-enable the particular computing feature (such as accessibility controls). In some examples, the EC can send the event to the feature management computing module 212 indicating that the particular hardware device 216 and/or driver associated with the particular hardware device 216 is ready for re-enumeration to make the particular computing feature operational at runtime, with or without a reboot of the information handling system 202. For example, the EC can send the event to the feature management computing module 212 indicating that i) the feature enablement flag associated with the particular computing feature is enabled and ii) the particular hardware device 216 is ready for a remediation action in response to the attempt to access the particular computing feature. In some examples, the event is an Advanced Configuration and Power Interface (ACPI) event.

The feature management computing module 212 performs, independent of action by the user 250, the remediation action at the particular hardware device 216 to enable the particular computing feature, at 318. That is, the feature management computing module 212 can facilitate the performance of, or perform, the remediation action at the particular hardware device 216 to enable the particular computing feature. In some examples, the feature management computing module 212 can perform the remediation action at the particular hardware device 216, or provide instructions to the controller 210 (e.g., BIOS), to perform the remediation action at the particular hardware device 216 to enable the particular computing feature.

In some examples, the feature management computing module 212 performs the remediation action at the particular hardware device 216 including renumerating a device driver associated with the particular hardware device 216. That is, the feature management computing module 212 performs the remediation action at the particular hardware device 216 including renumerating a device driver associated with the particular hardware device 216 to enable the particular computing feature of the particular hardware device 216 without user intervention. In some cases, the feature management computing module 212 provides a command to the controller 210 (BIOS) such that the controller 210 performs the remediation action at the particular hardware device 216 including renumerating a device driver associated with the particular hardware device 216. By updating the device driver associated with the particular hardware device 216, the particular computing feature of the particular hardware device 216 is enabled and operational.

In some examples, the feature management computing module 212 performs the remediation action at the particular hardware device 216 including installing a new device driver associated with the particular hardware device 216. That is, the feature management computing module 212 performs the remediation action at the particular hardware device 216 including installing a new device driver associated with the particular hardware device 216 to enable the particular computing feature of the particular hardware device 216 without user intervention. In some cases, the feature management computing module 212 provides a command to the controller 210 (BIOS) such that the controller 210 performs the remediation action at the particular hardware device 216 including installing a new device driver associated with the particular hardware device 216. By installing the new device driver associated with the particular hardware device 216, the particular computing feature of the particular hardware device 216 is enabled and operational.

In some examples, the feature management computing module 212 performs the remediation action at the particular hardware device 216 including updating firmware associated with the particular hardware device 216. That is, the feature management computing module 212 performs the remediation action at the particular hardware device 216 including updating firmware associated with the particular hardware device 216 to enable the particular computing feature of the particular hardware device 216 without user intervention. In some cases, the feature management computing module 212 provides a command to the controller 210 (BIOS) such that the controller 210 performs the remediation action at the particular hardware device 216 including updating firmware associated with the particular hardware device 216. By updating the firmware associated with the particular hardware device 216, the particular computing feature of the particular hardware device 216 is enabled and operational.

The feature management computing module 212 and/or the controller 210 performs the remediation action independent of user action by a user 250 of the information handling system. That is, the feature management computing module 212 and/or the controller 210 performs the remediation action at the information handling system 202 (and specifically, at the hardware devices 216) automatically in response to the feature enablement flag not being enabled and without user interaction/input. The feature management computing module 212 and/or the controller 210 can perform the remediation action (or remediation actions) to provide operability of the computing features of the hardware devices 216 by improving performance capabilities of the information handling system 202 (such as the hardware devices 216). That is, performing the remediation action(s) to the hardware devices 216 by the feature management computing module 212 and/or the controller 210 improves the performance capabilities of the information handling system 202 (the hardware devices 216) such that the functionality and the operability of the computing features of the hardware devices 216 is improved. In some examples, the feature management computing module 212 and/or the controller 210 can perform the remediation action (or remediation actions) to improve the performance capabilities of the information handling system 202 without user action/input by the user 250 (independent of user action/input by the user 250).

In some examples, after performing the remediation action at the particular hardware device 216, the information handling system 202 is rebooted. The information handling system 202 is rebooted such that the particular computing feature of the particular hardware device 216 is enabled after the remediation action is performed.

The usage of the particular computing feature of the particular hardware device 216 is enabled at the information handling system 202, at 320. That is, when a further attempt is made to access the particular computing feature of the particular hardware device 216, the particular computing feature is enabled at the information handling system 202.

In some examples, the feature management computing module 212 determines that the feature enablement flag associated with the particular computing feature is enabled (at 310), and in response, enables usage of the particular computing feature associated with the particular hardware device 216, at 322. That is, when a further attempt is made to access the particular computing feature of the particular hardware device 216, the particular computing feature is enabled at the information handling system 202.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of enabling features of hardware devices at an information handling system, including:

monitoring usage of computing features associated with the hardware devices at the information handling system;

detecting, based on the monitoring, an attempt to access a particular computing feature of the computing features of the hardware devices, the particular computing feature associated with a particular hardware device of the hardware devices;

accessing, in response to detecting the attempt, a table indicating a status of feature enablement flags, each feature enablement flag associated with a respective computing feature of the computing features of the hardware devices, the feature enablement flag for each computing feature indicating an enablement or disablement of the respective computing feature;

determining, based on the accessing, that the feature enablement flag associated with the particular computing feature is not enabled, and in response:

providing a command to a controller of the hardware devices indicating the particular computing feature;

updating, in response to the command and by the controller, the table to indicate that the feature enablement flag associated with the particular computing feature is enabled;

receiving, in response to the updating, an event indicating that the particular hardware device associated with the particular computing feature is ready for a remediation action; and performing, independent of user action, the remediation action at the particular computing device that is associated with the particular computing feature to enable the particular computing feature at the information handling system.

2. The computer-implemented method of claim 1, further including:

creating the table that indicates the status of the feature enablement flags.

3. The computer-implemented method of claim 1, wherein performing the remediation action at the particular computing device further includes renumerating a device driver associated with the hardware device.

4. The computer-implemented method of claim 1, wherein performing the remediation action at the particular computing device further includes installing a new device driver associated with the hardware device.

5. The computer-implemented method of claim 1, wherein performing the remediation action at the particular computing device further includes updating firmware associated with the hardware device.

6. The computer-implemented method of claim 1, further including:

determining, based on the accessing, that the feature enablement flag associated with the particular computing feature is enabled, and in response, enabling usage of the particular computing feature associated with the particular hardware device.

7. The computer-implemented method of claim 1, wherein providing the command to the controller further includes providing the command using a memory-mapped input/output (MMIO) path.

8. The computer-implemented method of claim 1, wherein receiving the event further includes receiving an Advanced Configuration and Power Interface (ACPI) event.

9. An information handling system comprising a processor having access to memory media storing instructions executable by the processor to perform operations, comprising:

monitoring usage of computing features associated with the hardware devices at the information handling system;

detecting, based on the monitoring, an attempt to access a particular computing feature of the computing features of the hardware devices, the particular computing feature associated with a particular hardware device of the hardware devices;

accessing, in response to detecting the attempt, a table indicating a status of feature enablement flags, each feature enablement flag associated with a respective computing feature of the computing features of the hardware devices, the feature enablement flag for each computing feature indicating an enablement or disablement of the respective computing feature;

determining, based on the accessing, that the feature enablement flag associated with the particular computing feature is not enabled, and in response:

providing a command to a controller of the hardware devices indicating the particular computing feature;

updating, in response to the command and by the controller, the table to indicate that the feature enablement flag associated with the particular computing feature is enabled;

receiving, in response to the updating, an event indicating that the particular hardware device associated with the particular computing feature is ready for a remediation action; and performing, independent of user action, the remediation action at the particular computing device that is associated with the particular computing feature to enable the particular computing feature at the information handling system.

10. The information handling system of claim 9, the operations further including:

creating the table that indicates the status of the feature enablement flags.

11. The information handling system of claim 9, wherein performing the remediation action at the particular computing device further includes renumerating a device driver associated with the hardware device.

12. The information handling system of claim 9, wherein performing the remediation action at the particular computing device further includes installing a new device driver associated with the hardware device.

13. The information handling system of claim 9, wherein performing the remediation action at the particular computing device further includes updating firmware associated with the hardware device.

14. The information handling system of claim 9, the operations further including:

determining, based on the accessing, that the feature enablement flag associated with the particular computing feature is enabled, and in response, enabling usage of the particular computing feature associated with the particular hardware device.

15. The information handling system of claim 9, wherein providing the command to the controller further includes providing the command using a memory-mapped input/output (MMIO) path.

16. The information handling system of claim 9, wherein receiving the event further includes receiving an Advanced Configuration and Power Interface (ACPI) event.

17. A non-transitory computer-readable medium storing software comprising instructions executable by one or more computers which, upon such execution, cause the one or more computers to perform operations comprising:

monitoring usage of computing features associated with the hardware devices at the information handling system;

detecting, based on the monitoring, an attempt to access a particular computing feature of the computing features of the hardware devices, the particular computing feature associated with a particular hardware device of the hardware devices;

accessing, in response to detecting the attempt, a table indicating a status of feature enablement flags, each feature enablement flag associated with a respective computing feature of the computing features of the hardware devices, the feature enablement flag for each computing feature indicating an enablement or disablement of the respective computing feature;

determining, based on the accessing, that the feature enablement flag associated with the particular computing feature is not enabled, and in response:

providing a command to a controller of the hardware devices indicating the particular computing feature;

updating, in response to the command and by the controller, the table to indicate that the feature enablement flag associated with the particular computing feature is enabled;

receiving, in response to the updating, an event indicating that the particular hardware device associated with the particular computing feature is ready for a remediation action; and performing, independent of user action, the remediation action at the particular computing device that is associated with the particular computing feature to enable the particular computing feature at the information handling system.

18. The non-transitory computer-readable medium of claim 17, the operations further including:

creating the table that indicates the status of the feature enablement flags.

19. The non-transitory computer-readable medium of claim 17, wherein performing the remediation action at the particular computing device further includes renumerating a device driver associated with the hardware device.

20. The non-transitory computer-readable medium of claim 17, wherein performing the remediation action at the particular computing device further includes installing a new device driver associated with the hardware device.

* * * * *